Figure 1:
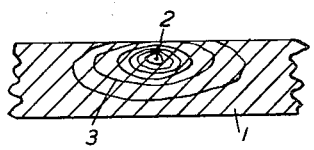

April 6, 1943.  F. B. WALDRON ET AL  2,315,885
METHOD OF MINIMIZING BREAKAGE OF GLASS DURING THE PRODUCTION
OF SURFACED CONTINUOUS STRIPS OF GLASS
Filed March 21, 1942

INVENTORS
Frederic James Waldron
James Harris Griffin
BY
Morrison, Kennedy & Campbell
ATTORNEYS.

Patented Apr. 6, 1943

2,315,885

UNITED STATES PATENT OFFICE 2,315,885

METHOD OF MINIMIZING BREAKAGE OF GLASS DURING THE PRODUCTION OF SURFACED CONTINUOUS STRIPS OF GLASS

Frederic Barnes Waldron, Prescot, and James Harris Griffin, St. Helens, England, assignors to Pilkington Brothers Limited, Liverpool, England, a British company Application March 21, 1942, Serial No. 435,738
In Great Britain April 24, 1941

4 Claims. (Cl. 51—283)

This invention relates to a method of minimizing breakage of glass during the production of a ground or ground and polished continuous strip of glass.

In manufacturing such a continuous strip of glass, molten glass from a tank is passed through a lehr and is then passed through a grinding or a grinding and polishing apparatus, comprising opposed tools which operate on both faces of the glass simultaneously, as a continuous unbroken strip.

Now, in the production of flat glass, certain faults occur from time to time, such as stones, or portions of incompletely molten raw material, and patches of glass embedded in the glass at a lower temperature than the general body of glass, which cause local strains in the glass.

During both the grinding and the polishing stages the glass is subjected to considerable stresses, these stresses being larger than those usual in the case of separate sheets or lengths of strip, and it is also exposed to considerable temperature variations due to the local heating set up by the action of the opposed polishing tools.

When a portion of the strip, which is thus in a state of local strain, due to a fault lying in or below the surface, enters the apparatus it is thereby subjected to additional mechanical stresses and also to the uneven, local heating with consequent fluctuating stresses which occur during polishing. Hence while the action of the polishing tools is in any case liable to cause fracture of the glass, such risk of fracture is greatly increased by the existence of a fult in the glass.

The main object of the present invention is to minimize the risk of fracture in the grinding or polishing apparatus due to the existence of a fault in the glass.

According to the invention, the effect of the fault in causing fracture in the moving continuous strip of glass can be largely removed, without in general removing from the glass the strain due to it, by making a depression in the glass in the area of the local strain, before the grinding operation. The depression must be made deeper than the thickness of glass removed by grinding, so that the area in which strain may remain after making the depression is not submitted to the action of the grinding and polishing tools. In these conditions, any strain left in the glass has much less effect in causing fracture.

When the fault is located upon, or is in, or near to one surface of the glass, a single depression only need be made and in such case, according to the invention, the depression may be made deep enough to remove the fault, but when the fault is of large volume or is near the centre of the thickness of the glass, it may be preferable to form depressions in both surfaces of the strip according to the location of the fault in the thickness of the glass. Such depressions do not remove the fault, but it has been found that they do lessen the liability to fracture.

The invention is applicable to apparatus in which the grinding apparatus is spaced from the lehr by a distance such that the time of travel of the strip from the end of the lehr to the start of the grinding apparatus is sufficient for carrying out the process. This time is preferably about ten minutes.

The depth of the depressions must be slightly greater than the thickness of the glass removed by grinding, so that the area of strain is not submitted to surface treatment by the last grinders or the polishers.

The depressions are preferably formed by grinding, and conveniently a portable electrically driven grinder is used, the operator controlling the grinder manually while kneeling on a wooden platform above the glass. By this grinding means it is possible, with the same grinder, to grind depressions on both the upper and on the underside of the glass, the grinder in the latter case working between the carrying rollers.

Alternatively the depressions may be made by a sand-blast, one or two nozzles being fixed temporarily to the moving strip and supplied with a sand-blast, preferably by means of a flexible pipe from a stationary sand-blast machine.

Experience has shown that by grinding a depression in accordance with the invention, the length of glass which contains or formerly contained the fault is enabled to pass through the grinding and polishing apparatus without breakage, where the superimposing of the stresses due to the action of the tools on any stress remaining in the glass would have engendered a stress tending to cause fracture.

In the accompanying diagrammatic drawing are indicated typical faults in glass strip and the manner of dealing with the areas of strain caused by such faults in accordance with the invention.

In the drawing each of the figures are sectional elevations through a portion of glass strip which is on its way from a lehr to grinders and polishers which operate on both sides of the glass simultaneously.

Figure 2:
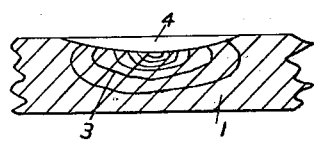
Figure 3:
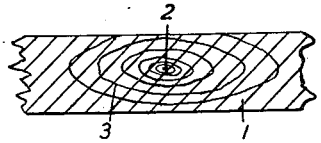
Figure 4:
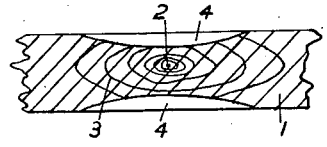

Figure 1 shows a portion of glass strip having a fault near one (the upper) surface of the glass strip, and Figure 3 is a similar portion of glass strip having a fault near the middle of the thickness of the glass; and Figures 2 and 4 respectively indicate the treatment of the surface of the portions of the glass strip in accordance with the invention to prevent the areas of strain caused by the respective faults being subjected to the stresses developed by the surfacing tools, particularly the polishers.

In Figure 1 the glass strip 1 is shown with a fault 2 which is near the upper surface and which fault creates an area of strain indicated by the curved lines 3.

In Figure 2 the same piece of glass is shown with a shallow depression 4 in the upper surface of the glass formed by grinding the surface of the glass in the area of strain, so that there is not left an area of strain caused by the fault which is within the thickness of the glass which will be removed in subsequent grinding and polishing operations and which, if subjected to the stresses developed by the surfacing tools, might tend to cause fracture.

It should be noted, on considering Figures 1 and 2, that although the depression 4, made in the particular circumstances indicated, removes the fault 2, the area of strain caused by that fault is not removed by merely eradicating the fault, and it is only incidental that in the operation of forming the depression 4 that the fault 2 is eliminated, moreover that the lines 3 are not lines of strain but are intended to indicate graphically where the strain engendered by the fault exists, but the proximity of the lines 3 to one another is intended to indicate that the more severe strain is immediately about the fault and that the strain diminishes with distance from the fault.

In Figure 3 the strip of glass 1 is shown as having a fault at the centre of the thickness of the glass which has developed an area of strain reaching with sufficient intensity to each surface of the glass to provide in each surface, in the surfacing operation, areas which, if subjected to stresses of the tools, may lead to fracture. Accordingly with this type of fault, a shallow depression 4 is formed in each surface of the glass to remove from the surface any area of strain of sufficient intensity to lead to fracturing on being subjected to the stresses developed by the tools. Such depressions do not remove the fault but they do lessen the liability to fracture.

We claim:

1. The method of minimizing breakage of glass during the production of a continuous strip of glass comprising the steps of making a shallow depression in the surface of the glass in the area of glass strained by a fault and then grinding both surfaces of the strip simultaneously, the depth of the depression being slightly greater than the thickness of glass removed by the grinding.

2. The method of minimizing breakage of glass during the production of a continuous ground and polished strip of glass comprising the steps of making a shallow depression in the surface of the glass in the area of glass strained by a fault and then grinding and polishing both surfaces of the strip simultaneously, the depth of the depression being slightly greater than the thickness of glass removed by the grinding.

3. The method of minimizing breakage of glass during the production of a continuous strip of glass comprising the steps of making shallow depressions in the two surfaces of the glass in the area of glass strained by a fault and then grinding both surfaces of the strip simultaneously, the depth of each depression being slightly greater than the thickness of glass removed by the grinding.

4. The method of minimizing breakage of glass during the production of a continuous ground and polished strip of glass comprising the steps of making shallow depressions in the two surfaces of the glass in the area of glass strained by a fault and then grinding and polishing both surfaces of the strip simultaneously, the depth of each depression being slightly greater than the thickness of glass removed by the grinding.

FREDERIC BARNES WALDRON.
JAMES HARRIS GRIFFIN.